June 9, 1959  A. L. SAVIGNAC  2,890,317
PIE CRUST BAKER
Filed Aug. 20, 1957  2 Sheets-Sheet 1
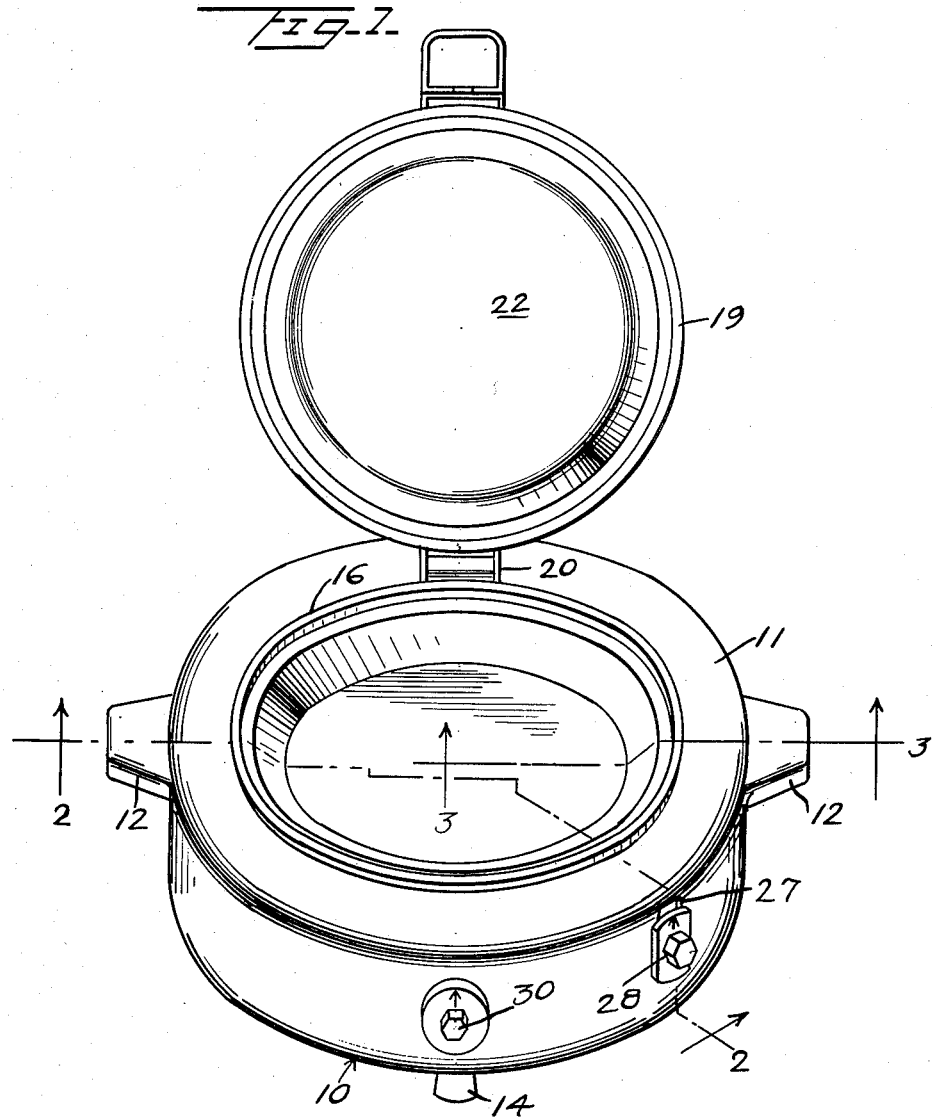
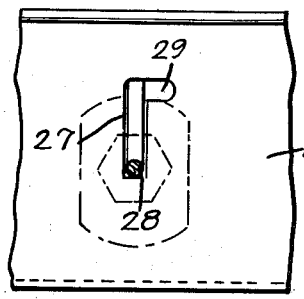
INVENTOR
*Alphonse L. Savignac*
BY *Kimmel & Crowell*
ATTORNEYS

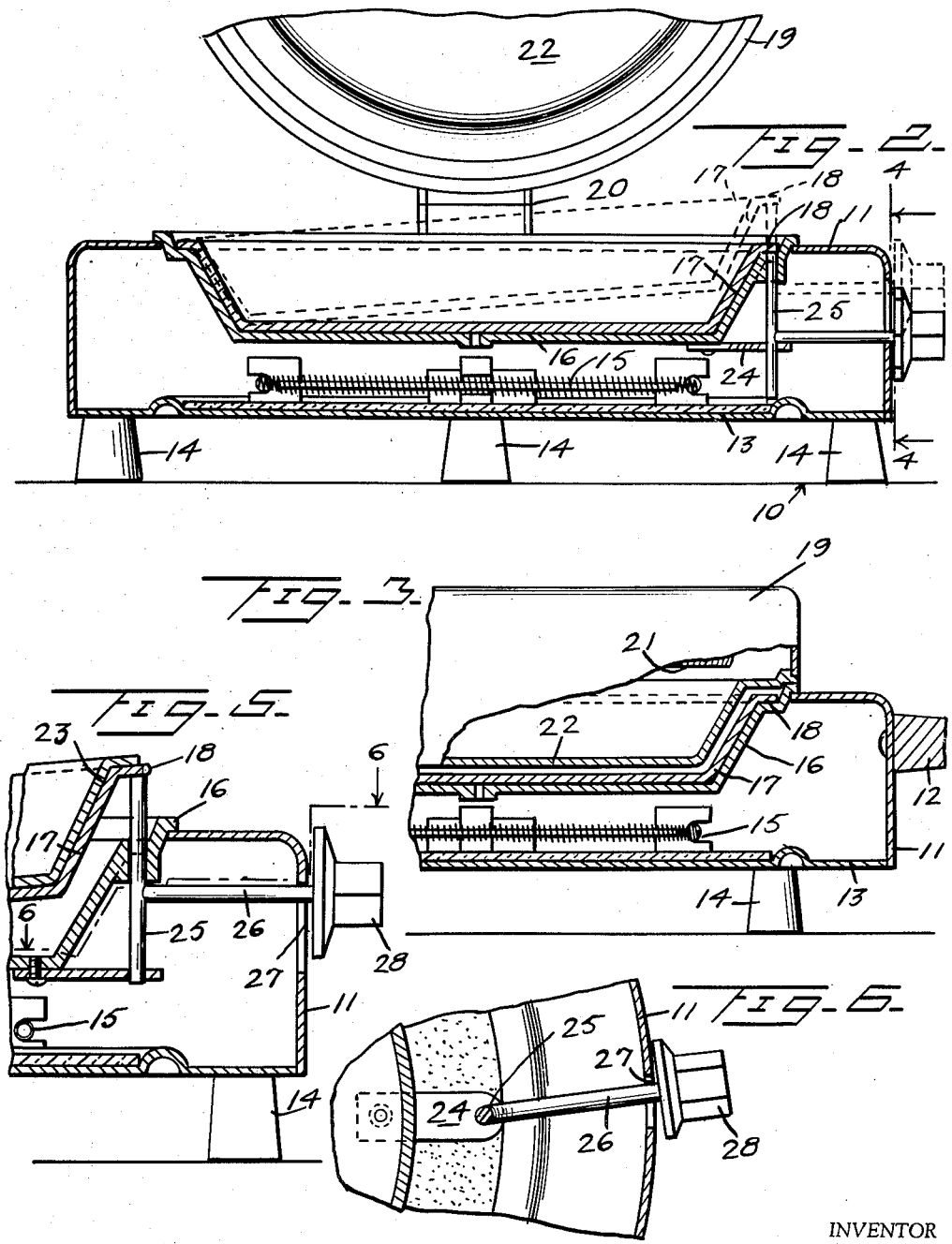

United States Patent Office 2,890,317
Patented June 9, 1959

2,890,317

PIE CRUST BAKER

Alphonse L. Savignac, Taftville, Conn.

Application August 20, 1957, Serial No. 679,300

1 Claim. (Cl. 219—19)

The present invention relates to pie crust bakers, and more particularly to devices for baking pie shells used in custard type pies.

The primary object of the invention is to provide a pie shell baker which molds the pie shell to the correct shape and bakes it after molding.

Another object of the invention is to provide a pie shell baker of the class described above which is portable, self-contained, and is heated by electricity.

A further object of the invention is to provide a pie shell baker of the class described above wherein means are provided for removing the pie shell and baking pan following the baking operation.

Another object of the invention is to provide a pie shell baker incorporating a baking pan removably seated in the pie shell baker.

A further object of the invention is to provide a pie shell baker which simultaneously applies heat to both sides of the pie shell in order to speed the baking operation.

Other objects and advantages will become apparent in the following specification when considered in the light of the attached drawings, in which:

Figure 1 is a perspective view of the invention.

Figure 2 is a transverse vertical cross-section taken along the line 2—2 of Figure 1, looking in the direction of the arrows.

Figure 3 is an enlarged fragmentary transverse cross-section taken along the line 3—3 of Figure 1, looking in the direction of the arrows.

Figure 4 is an enlarged fragmentary vertical cross-section taken along the line 4—4 of Figure 2, looking in the direction of the arrows.

Figure 5 is an enlarged fragmentary portion of Figure 2, illustrating the pie plate removing device.

Figure 6 is a horizontal fragmentary cross-section taken along the line 6—6 of Figure 5, looking in the direction of the arrows.

Referring now to the drawings in detail wherein like reference characters indicate like parts throughout the several figures, the reference numeral 10 indicates generally a pie shell baker constructed in accordance with the invention.

The pie shell baker 10 comprises a lower housing 11 having a pair of oppositely disposed handles 12 extending outwardly therefrom. A bottom wall 13 is detachably secured to the housing 11 and supports a plurality of feet 14 arranged to maintain the housing 11 in spaced relation to a table or other support.

A heating element 15 of the electric resistance type is mounted in spaced relation above the bottom wall 13 and connected to a source of electricity by means (not shown).

A recess support 16 is secured centrally to the housing 11 and extends into the top thereof. A pie pan 17 having a horizontal annular flange 18 formed thereon is positioned in the recess support 16, as is shown in Figures 2 and 3.

An upper housing 19 is hinged at 20 to the housing 11 and has an electric heating element 21 positioned therein and connected by means (not shown) to a source of electric energy. A bottom wall 22 on the housing 19 is adapted to engage within the support 16 in spaced relation thereto to form a pie crust 23 in cooperation with the pie pan 17, as illustrated in Figure 5.

A bracket 24 extends outwardly from the lower face of the support 16, and a vertical pin 25 extends therethrough and upwardly through the outer edge of the support 16. The pin 25 is adapted to engage under the flange 18 of the pie pan 17 to lift the pie pan 17 upwardly out of the support 16 to assist in removing the pie pan 17 and pie crust 23 when the baking is completed.

The pin 25 has a horizontal shaft 26 integrally connected thereto and extending through a vertical slot 27 formed in the housing 11. A handle 28 is secured to the outer end of the shaft 26 for raising the shaft 26, and hence the pin 25 when the baking is complete.

The slot 27 has a laterally extending offset portion 29 formed on its upper end to permit the shaft 26 to be engaged therein to support the pin 25 in raised position when such is desired.

A standard heat control element (not shown) is attached to the device within the housing 11 and is controlled by a knob 30 on the housing 11, as seen in Figure 1.

Having thus described the preferred embodiment of the invention, it should be understood that numerous structural modifications and adaptations may be resorted to without departing from the scope of the appended claim.

What is claimed is:

A pie shell baker comprising a housing, including a top wall, said top wall having a closed annular recess formed therein, a second housing hingedly secured to said first housing, a removable pie pan supported in said annular recess in said first housing forming a lower mold, an upper mold formed on said second housing in depending relation thereto for cooperative relation to said pie pan to mold a pie shell therebetween, electric heating means in each of said housings for baking said pie shell, and a vertically movable shaft supported on said lower housing and positioned for vertical movement through said annular recess adjacent the peripheral edge of said recess for engaging and raising one edge of said pie pan from said recess when the pie shell has been baked.

References Cited in the file of this patent

UNITED STATES PATENTS

| | | |
|---|---|---|
| 1,977,084 | Person | Oct. 16, 1934 |
| 1,978,872 | Wharton | Oct. 30, 1934 |
| 2,018,698 | Allen | Oct. 29, 1935 |
| 2,764,081 | Glasser | Sept. 25, 1956 |